(12) United States Patent
Zheng et al.

(10) Patent No.: US 6,556,994 B1
(45) Date of Patent: Apr. 29, 2003

(54) METHOD AND SYSTEM FOR IMPROVING CONCURRENCY THROUGH EARLY RELEASE OF UNNECESSARY LOCKS

(75) Inventors: Roger Luo Q. Zheng, Scarborough (CA); Michael J. Winer, Markham (CA); Catharina K. Wong, Etobicoke (CA); Kathy A. McKnight, Gormley (CA)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 09/625,232

(22) Filed: Jul. 25, 2000

(30) Foreign Application Priority Data

Jul. 29, 1999 (CA) ............................................. 2279051

(51) Int. Cl.⁷ .............................................. G06F 17/30
(52) U.S. Cl. ..................... 707/8; 707/1; 707/3; 709/229
(58) Field of Search ................................ 707/1, 8, 3, 4, 707/5, 6, 10, 103 R, 104.1, 201, 205; 709/229

(56) References Cited

U.S. PATENT DOCUMENTS

| | | | | |
|---|---|---|---|---|
| 5,263,155 A | | 11/1993 | Wang ............................ 707/8 |
| 5,283,894 A | * | 2/1994 | Deran ............................ 707/1 |
| 5,832,484 A | * | 11/1998 | Sankaran et al. ............... 707/8 |
| 5,899,988 A | | 5/1999 | Depledge et al. .............. 707/3 |
| 5,983,225 A | * | 11/1999 | Anfindsen .................... 707/201 |
| 6,067,540 A | | 5/2000 | Ozbutun et al. ................ 707/3 |
| 6,324,581 B1 | * | 11/2001 | Xu et al. ..................... 709/229 |

FOREIGN PATENT DOCUMENTS

WO    WO 9933001    7/1999    ........... G06F/17/30

* cited by examiner

*Primary Examiner*—Charles Rones
*Assistant Examiner*—Tony Mahmoudi
(74) *Attorney, Agent, or Firm*—Sawyer Law Group LLP

(57) ABSTRACT

A lock control data structure for a unit of work of an application program. The unit of work has a set of threads of access for opening a set of objects accessible to the application program. The lock control data structure has a set of object-specific lock models corresponding to the set of objects, and a lock controller for locking each object in the set of objects. Information regarding the lock requirements for each object are stored in the corresponding object-specific lock model. The lock controller locks and unlocks each object in the set of objects based on the information stored in the corresponding object-specific lock model.

6 Claims, 4 Drawing Sheets

Example1: only Cursor A and B used and only Application 1

| Time | Application Logic | L1row1BM | L1row2BM | L1row3BM |
|---|---|---|---|---|
| 1 | Fetch on Cursor A returns row1 | 0001 | 0000 | 0000 |
| 2 | Fetch on Cursor A returns row2 | 0001 | 0001 | 0000 |
| 3 | Fetch on Cursor B returns row2 | 0001 | 0011 | 0000 |
| 4 | Fetch on Cursor B returns row3 | 0001 | 0011 | 0010 |
| 5 | close with release for Cursor A (lock for row1 is released) | 0000 | 0010 | 0010 |
| 6 | close with release for Cursor B (locks for row2 and row3 are released) | 0000 | 0000 | 0000 |
| 7 | commit (locks on row1, row2, row3 already released) | 0000 | 0000 | 0000 |

FIG. 2

Example2: Application 1 using Cursor A and B
Application 2 using Cursor X
Application 2 does not have to wait until Application 1 commit

| Time | Application Logic | (a) | (b) | (c) | (d) | (e) | (f) |
|---|---|---|---|---|---|---|---|
| 1 | 1) Fetch on Cursor A returns row1 | 0001 | 0000 | 0000 | 0000 | 0000 | 0000 |
| 2 | 1) Fetch on Cursor A returns row2 | 0001 | 0001 | 0000 | 0000 | 0000 | 0000 |
| 3 | 1) Fetch on Cursor B returns row2 | 0001 | 0011 | 0000 | 0000 | 0000 | 0000 |
| 4 | 1) Fetch on Cursor B returns row3 | 0001 | 0011 | 0010 | 0000 | 0000 | 0000 |
| 5 | 2) Fetch on Cursor X has to wait for lock on row1 | | | | | | |
| 6 | 1) close with release for Cursor A (no lock is released) | 0000 | 0010 | 0010 | 0000 | 0000 | 0000 |
| 7 | 2) Fetch on Cursor X returns row1 | 0000 | 0010 | 0010 | 0001 | 0000 | 0000 |
| 8 | 2) Fetch on Cursor X has to wait for lock on row2 | | | | | | |
| 9 | 1) close with release for Cursor B (locks for row1 and row2 are released) | 0000 | 1000 | 1000 | 0001 | 0000 | 0000 |
| 10 | 2) Fetch on Cursor X returns row2 | 0000 | 0000 | 0000 | 0001 | 0001 | 0000 |
| 11 | 2) Fetch on Cursor X returns row3 | 0000 | 0000 | 0000 | 0001 | 0001 | 0001 |
| 12 | 1) Commit (locks on row1, row2, row3 already released) | 0000 | 0000 | 0000 | 0001 | 0001 | 0001 |

| Due to space limitation, | (a) means L1row1BM | (d) means L2row1BM |
|---|---|---|
| | (b) means L1row2BM | (e) means L2row2BM |
| | (c) means L1row3BM | (f) means L2row3BM |

FIG. 3

Example3: Application 1 using Cursor A, B, C, D, E
Application 2 using Cursor X
Application 2 has to wait until Application 1 commit
to get all the locks it needs.

| Time | Application Logic | (a) | (b) | (c) | (d) | (e) | (f) |
|---|---|---|---|---|---|---|---|
| 1 | 1) Fetch on Cursor A returns row1 | 0001 | 0000 | 0000 | 0000 | 0000 | 0000 |
| 2 | 1) Fetch on Cursor A returns row2 | 0001 | 0001 | 0000 | 0000 | 0000 | 0000 |
| 3 | 1) Fetch on Cursor B returns row2 | 0001 | 0011 | 0000 | 0000 | 0000 | 0000 |
| 4 | 1) Fetch on Cursor B returns row3 | 0001 | 0011 | 0010 | 0000 | 0000 | 0000 |
| 5 | 1) Fetch on Cursor C returns row1 | 0101 | 0011 | 0010 | 0000 | 0000 | 0000 |
| 6 | 1) Fetch on Cursor D returns row2 | 0101 | 1011 | 0010 | 0000 | 0000 | 0000 |
| 7 | 1) Fetch on Cursor E returns row3 | 0101 | 1011 | 1010 | 0000 | 0000 | 0000 |
| 8 | 2) Fetch on Cursor X has to wait for lock on row1 | | | | | | |
| 9 | 1) close with release for Cursor A (no lock is released) | 0100 | 1010 | 1010 | 0000 | 0000 | 0000 |
| 10 | 1) close with release for Cursor B (no lock is released) | 0100 | 1000 | 1000 | 0000 | 0000 | 0000 |
| 11 | 1) close with release for Cursor C (lock for row1 is released) | 0000 | 1000 | 1000 | 0000 | 0000 | 0000 |
| 12 | 2) Fetch on Cursor X returns row1 | 0000 | 1000 | 1000 | 0001 | 0000 | 0000 |
| 13 | 2) Fetch on Cursor X has to wait for lock on row2 | | | | | | |
| 14 | 1) close with release for Cursor D (no change in bitmap because Cursor D uses the ReservedBit) | 0000 | 1000 | 1000 | 0001 | 0000 | 0000 |
| 15 | 1) close with release for Cursor E (no change in bitmap because Cursor E uses the ReservedBit) | 0000 | 1000 | 1000 | 0001 | 0000 | 0000 |
| 16 | 1) Commit (locks on row2, row3 are released) | 0000 | 0000 | 0000 | 0001 | 0000 | 0000 |
| 17 | 2) Fetch on Cursor X returns row2 | 0000 | 0000 | 0000 | 0001 | 0001 | 0000 |
| 18 | 2) Fetch on Cursor X returns row3 | 0000 | 0000 | 0000 | 0001 | 0001 | 0001 |

Due to space limitation, (a) means L1row1BM (d) means L2row1BM
(b) means L1row2BM (e) means L2row2BM
(c) means L1row3BM (f) means L2row3BM

FIG. 4

METHOD AND SYSTEM FOR IMPROVING CONCURRENCY THROUGH EARLY RELEASE OF UNNECESSARY LOCKS

CROSS-REFERENCE TO RELATED APPLICATIONS

This application claims benefit under 35 USC 119 of Canadian Application 2,279,051 filed on Jul. 29, 1999.

FIELD OF THE INVENTION

The present invention relates generally to lock management in database management systems, and more particularly relates to a method and system for improving concurrency through early release of locks that are no longer required.

BACKGROUND OF THE INVENTION

In database management systems, the transactions that form the basic building blocks of the system are commonly referred to as units of work. In executing a transaction or a unit of work, records from the data files of the database management system may be added, deleted, changed or read.

A database management system may temporarily be in an inconsistent state during a unit of work. Consider, for example, a customer information table that is being updated by a unit of work after a payment has been received from a customer. The unit of work comprises a first operation, in which the accounts receivable for customer A is reduced by the amount of the payment, and a second operation in which the cash receipts for customer A is increased by the amount of the payment. After the first operation has executed, but before the second operation has executed, the accounts receivable and cash receipts data are inconsistent in that they represent different states of affairs. The accounts receivable and cash receipts data will become consistent again if either the first operation rolls back, or the second operation executes.

A unit of work is a sequence of operations that is used by a database management system to ensure that data is in a consistent state. Any changes to data in a database management system are made during a unit of work and the results of the execution must be retained or not as a whole. Accordingly, a unit of work must end with either a COMMIT or a ROLLBACK statement. By the COMMIT statement, all of the changes within the unit of work are made permanent, while by the ROLLBACK statement, all of these changes are removed. In the above example, either both of the operations should be made permanent, or neither of the operations should be made permanent. If either operation is not successfully executed, then the data should be left as it was before the unit of work began.

A unit of work opens data through threads of access. In the above example, the first operation has a first thread of access to accounts receivable data, by means of which the accounts receivable data is updated, and the second operation has a second thread of access to cash receipts data by means of which the accounts receivable data is updated. Threads of access may be internal or external. In the case of an external thread of access, the user may directly control access to the information by, for example, controlling a user-defined cursor in an application. Alternatively, in the case of an internal thread of access, catalog information may be read while compiling a structured query language (SQL) statement.

In a database management system, data accessed in a unit of work needs to be protected against being accessed or changed by other units of work. Locks are used to provide this protection. Some locks can be released as soon as the data has been acquired, while other locks must be held until the end of the unit of work. A unit of work may have multiple threads of access to data open at the same time, and a piece of data may be accessed by more than one thread. When a particular thread of access for a unit of work ends, the unit of work cannot release the locks required by the particular thread of access if other threads of access for the same unit of work still need those locks for protection.

One approach is to hold all of the locks on all of the data until the unit of work terminates. However, this approach unnecessarily reduces concurrency as other units of work will have to wait until the present unit of work releases the lock despite the fact that the present unit of work does not actually need the lock.

Thus, a method and system for retaining a lock for a unit of work while such lock is required by at least one thread of access of the unit of work, and for releasing the lock when this condition is no longer met, are desirable.

SUMMARY OF THE INVENTION

An object of one aspect of the present invention is to provide an improved means for managing locks to a set of objects.

In accordance with one aspect of the present invention there is provided a lock control data structure for a unit of work of an application program. The unit of work has a set of threads of access for opening a set of objects accessible to the application program. The lock control data structure includes a set of object-specific lock models corresponding to the set of objects, and a lock controller for locking each object in a set of objects. Each object-specific lock model has an associated set of lock elements corresponding to the set of threads of access such that a thread-specific access requirement for each thread in the set of threads of access is representable by an associated lock element in the associated set of lock elements. Each object in the set of object has an associated object-specific lock model in the set of object-specific lock models wherein the associated set of lock elements of the associated object-specific lock model dynamically stores the thread specific access requirement of each thread in the set of threads relative to the object. The lock controller locks each object in the set of objects when the associated set of lock elements of the associated object-specific lock model is not empty. The lock controller unlocks each object in the set of objects when the associated set of lock elements of the associated object-specific lock model is emptied. The associated set of lock elements of the associated object-specific lock model is empty when it stores no locking requirements.

In accordance with another aspect of the present invention there is provided a computer software product for an application program having a unit of work. The unit of work has a set of threads of access for opening a set of objects accessible to the application program. The computer software program comprises a recording medium and the means recorded on the medium for configuring a computer to have a lock control data structure. The lock control data structure has a set of object-specific lock models corresponding to the set of objects, and a lock controller for locking each object in a set of objects. Each object-specific lock model has an associated set of lock elements corresponding to the set of threads of access such that a thread-specific access requirement for each thread in the set of threads of access is representable by an associated lock element in the associated set of lock elements. Each object in the set of object has an associated object-specific lock model in the set of object-specific lock models wherein the associated set of lock elements of the associated object-specific lock model dynamically stores the thread specific access requirement of each thread in the set of threads relative to the object. The lock controller locks each object in the set of objects when the associated set of lock elements of the associated object-specific lock model is not empty. The lock controller unlocks each object in the set of objects when the associated set of lock elements of the associated object-specific lock model is emptied. The associated set of lock elements of the associated object-specific lock model is empty when it stores no locking requirements.

In accordance with a further aspect of the present invention there is provided a data processing system for opening a set of objects accessible to the data processing system in the unit of work. The unit of work has a set of threads of access for opening the set of objects. The data processing system includes a lock control data structure having a set of object-specific lock models corresponding to the set of objects, and a lock controller for locking each object in a set of objects. Each object-specific lock model has an associated set of lock elements corresponding to the set of threads of access such that a thread-specific access requirement for each thread in the set of threads of access is representable by an associated lock element in the associated set of lock elements. Each object in the set of object has an associated object-specific lock model in the set of object-specific lock models wherein the associated set of lock elements of the associated object-specific lock model dynamically stores the thread specific access requirement of each thread in the set of threads relative to the object. The lock controller locks each object in the set of objects when the associated set of lock elements of the associated object-specific lock model is not empty. The lock controller unlocks each object in the set of objects when the associated set of lock elements of the associated object-specific lock model is emptied. The associated set of lock elements of the associated object-specific lock model is empty when it stores no locking requirements.

BRIEF DESCRIPTION OF THE DRAWINGS

FIG. 2, in a lock table, illustrates a sequence of threads of access of a single unit of work obtaining and releasing locks relative to different records in accordance with an aspect of the invention;

FIG. 3, in a lock table, illustrates a sequence of threads of access of two different units of work obtaining and releasing locks relative to different records in accordance with an aspect of the invention; and, FIG. 4, in a lock table, illustrates a sequence of threads of access of two different units of work obtaining and releasing locks relative to different records in accordance with a preferred aspect of the invention.

DESCRIPTION OF THE INVENTION

Figure 1:
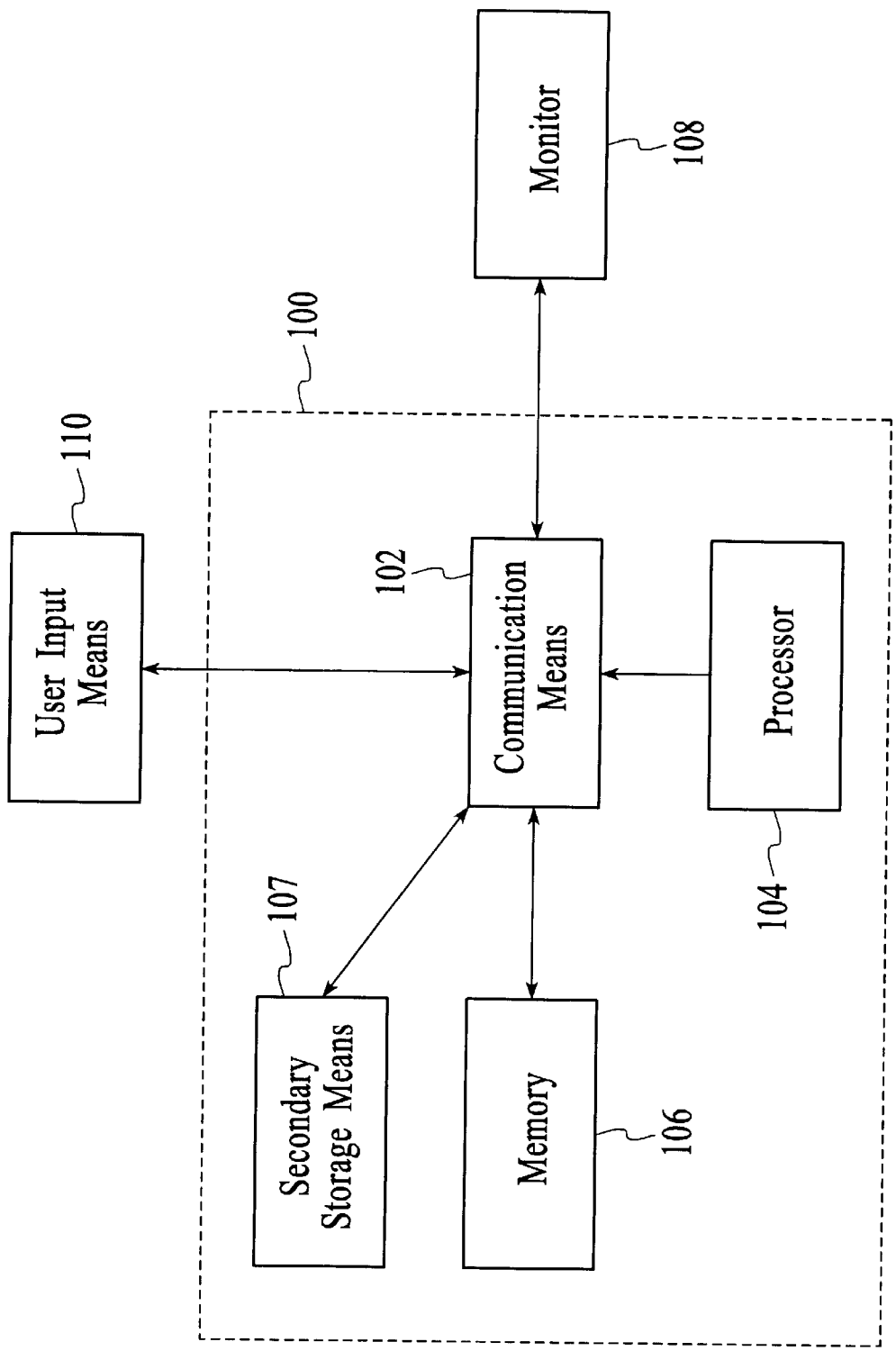
FIG. 1, in a block diagram, illustrates a computer system that may be configured to implement an embodiment of the invention.

Referring to FIG. 1, there is illustrated a computer system 100 on which a preferred embodiment of the present invention can be implemented. The computer system 100 includes a communicating means 102 for communicating information, and a processor 104 that is connected to the communication means 102. The computer system 100 further comprises a memory 106 for storing data records and instructions regarding the manipulation of such data records, and a secondary storage means 107 such as a disk drive or a hard drive. The memory 106 is connected to the processor 104 via the communication means 102, as are a monitor 108 and user input means 110, such as a keyboard or mouse. In the preferred embodiment, the present invention relates to the use of the computer system 100 to execute a lock management program that enables locks to be released sooner than would otherwise be possible in some situations, thereby improving concurrency by permitting earlier access to the formerly locked records. Details of the locking program are provided below.

The pseudo code listings that follow, illustrate the process by which a bit in a bitmap is assigned for each thread of access. Each thread of access starts with the OPEN( )call, accesses the data in this thread with the FETCH ( ) call, and ends the thread with the CLOSE( )call. The first listing shows how a bit in the bitmap is first assigned for a thread of access.

```
OPEN ()
{
bit = getFreeBit ();
return (bit);
}
getFreeBit()
{
if(there is a free bit)
{
        let bit be free bit;
        markBitInUse (bit);
        return(bit);
}
else
{
        return(SPECIAL_RESERVE_BIT);
}
}
```

In the first listing, a bit is assigned from the bitmap when a thread of access requests a bit for the first time for any record—this is the getFreeBit function. If there are no more free bits, then the reserved bit is assigned for the thread of access—this is the return (SPECIAL_RESERVE_BIT) call. If, however, there are still free bits in the bitmap, then such a bit is assigned and is marked used by the markBitInUse function.

The next pseudo code listing relates to how the bit is used once it has been assigned to the thread of access.

```
FETCH(bit)
{
lock = lockDataElement ();
lock.bitmap = lock.bitmap / bit
}
```

When the bit has been assigned to the thread of access, the record is locked and the bit is included in the bitmap for the bitmap for this lock.

After the thread of access terminates, the lock against the record should, if possible, be released. If there is another thread of access that still requires a lock against the record then it will not be released. However, if no other thread of access requires a lock against the record, then the following pseudo code listing sets out how the lock may be released.

```
CLOSE(bit, earlyRelease)
{
 if((bit <> SPECIAL_RESERVE_bit) and
    (earlyRelease = TRUE))
 {
  lock = getFirstLock();
  while (lock <> END_OF_LOCK_LIST)
  {
     lock.bitmap = lock.bitmap & (-bit);
     if(lock.bitmap = 0)
     {
        releaseLock(lock);
     }
     lock = getNextLock();
  }
 }
}
```

If the bit that has been assigned to a thread of access is not the reserved bit, and the earlyRelease flag equals true, indicating that the lock may be released before the transaction terminates, then the procedure of updating the bitmaps for each lock to reflect the fact that a lock is no longer required by the thread of access commences. The process according to the pseudo code listing starts at the first lock bitmap—the first lock bitmap for a record—and removes the bit for the thread of access from such bitmap. If the lock bitmap is empty as a result of the removal of the bit, then the lock is released against this record. The process according to the pseudo code then runs through the same procedure for the next lock bitmap.

Referring to FIG. 2, the sequence in which locks are obtained and released according to an aspect of the present invention is illustrated in a locking table. In the locking table of FIG. 2, two threads of access, cursor A and cursor B, fetch data. Both of these threads of access belong to a single unit of work 1—denoted application 1 in FIG. 2. The data records fetched are records 1, 2 and 3 of a data table (not shown). Specifically, cursor A returns records 1 and 2, and cursor 2 return's records 2 and 3. When any of records 1, 2 or 3 are fetched by the cursors A and B, such record is locked. Unit of Work 1 has an associated bitmap in which lock information may be stored. In the locking table of FIG. 2, the bitmap is shown with only 4 bits in order to save space; however, the bitmap may have many more bits. Alternatively, the bitmap may include as many bits as are required to distinctly record all of the threads of access that require locks against the records opened by Unit of Work 1 owning the bitmap. Unit of Work 1 maintains a bitmap for each record it accesses.

When a thread of access requests a lock against a record, a bit in the bitmap is granted for this request. If this is the first request for a lock by the particular thread of access, then the thread of access will be assigned a particular site in the bitmap where the presence of one of a "1" or "0" will indicate whether or not such thread of access requires a lock against the record represented by the bitmap. In the locking table of FIG. 2, the bitmap columns represent different records. Specifically, column heading L1row1BM, which appears at the top of the first column, indicates that the bitmaps listed below relate to whether or not the threads of access of a Unit of Work 1 require a lock (L1) against record 1. Similarly, column heading L1row2BM, which appears at the top of the second column, indicates that the bitmaps listed below relate to whether or not the threads of access of Unit of Work 1 require a lock (L1) against record 2, and column heading L1row3BM, which appears at the top of the third column, indicates that the bitmaps listed below relate to whether or not the threads of access of Unit of Work 1 require a lock (L1) against record 3. Each row in the locking table represents a different time in the Unit of Work 1.

In row 1 of the locking table of FIG. 2, cursor A requires a lock on record 1 as the fetch on cursor A is to return record 1. Accordingly, Unit of Work 1 requests and obtains a lock on record 1. As this is the first lock required by cursor A, cursor A is at this point assigned a site in the bitmap (the sites, may, of course, be assigned in any order). This site is the rightmost bit, and the fact that cursor A requires a lock on record 1 is indicated by the bitmap of the first row of the L1row1BM column, having a 1 and not a 0 at its rightmost bit. Next, as illustrated in the second row of the locking table of FIG. 2, cursor A requires a lock on record 2 as the fetch on cursor A is to return record 2. Unit of Work 1 requests and obtains a lock on record 2. As cursor A has already been assigned the rightmost bit in the bitmap, the 0 at the rightmost place of the bitmap in the first row under the column headed L1row2BM, is replaced by a 1 in the bitmap of the second row of this column.

In row 3 of the locking table of FIG. 2, cursor B requires a lock on record 2 as the fetch on cursor B is to return record 2. This is the first time that cursor B has required a lock, so cursor B is assigned a site in the bitmap. This site is adjacent to the site for cursor A—in other words, the site for cursor B is the second from the right. Unit of Work 1 has already obtained a lock on record 2, however, so no new lock is requested for record 2 by cursor B. Instead, a 1 is placed in the cursor B site of the bitmap for record 2, indicating that cursor B as well as cursor A requires a lock on record 2. In the fourth row of the locking table of FIG. 2, cursor B requires a lock on record 3 as the fetch on cursor B is to return record 3. As record 3 has not previously been locked, Unit of Work 1 requests and obtains a lock on record 3. As cursor B has already been assigned a bitmap site, a 1 is placed at this bitmap site in the bitmap in the fourth row under the column headed L1row3BM.

In row 5, the bit for Cursor A is reset by replacing the 1 in the rightmost bit of the bitmaps under column headings L1row1BM and L1row2BM with a 0, indicating that Cursor A no longer requires a lock against records 1 and 2. As the bitmap for record 1 is now empty (it consists entirely of zeros), Unit of Work 1 releases the lock on record 1. The bitmap under L1row3BM is not changed as cursor A never required a lock as against record 3. The bitmaps under column headings L1row2BM and L1row3BM retain a 1 in the bitmap site for cursor B. In row 6, the bit for cursor B is closed by replacing the 1 in the bitmap site redo for cursor B with a 0—this affects the bitmaps for records 2 and 3—columns L1row2BM and L1row3BM—for which records cursor B formerly required a lock. All the bitmaps are now empty, and Unit of Work 1 will release the remaining locks against records 2 and 3. At some subsequent point, Unit of Work 1 commits. Accordingly, as compared with a unit of work that waits until the unit of work commits before releasing locks on records accessed during the unit of work, Unit of Work 1 of the present invention releases the lock on record 1 when cursor A is complete, and releases the lock on records 2 and 3 when cursor B is complete, thereby increasing concurrency by reducing the period of time during which records 1,2 and 3 are locked by Unit of Work 1.

Referring to FIG. 3, the sequence in which locks are obtained and released by a Unit of Work 1' and a Unit of Work 2' according to an aspect of the present invention is illustrated in a locking table. In the locking table of FIG. 3, two threads of access, Cursor A' and Cursor B' are fetching records. Both of these threads of access belong to Unit of Work 1'. A third thread of access, Cursor X, belongs to Unit of Work 2' and is also fetching records. As in the previous example of FIG. 2, the records fetched are records 1, 2 and 3 of a single data table. When the records are fetched by any of the threads of access, the records opened by the threads of access are locked. Each of the Units of Work 1' and 2' has an associated bitmap for each lock having a dimension of four bits.

As with the example of FIG. 2, once a thread of access requests a lock, a bit in the bitmap is set to 1 for the request. If this is the first request for a lock by a particular thread of access, then the thread of access will be assigned a particular site in the bitmap where the presence of one of a 1 or 0 will indicate whether or not such thread of access has attained a lock against the record.

In the locking table of FIG. 3, each column represents different records accessed by Units of Work 1' and 2'. The bitmaps listed under the column headed (a) represent the locks required by threads of access of Unit of Work 1' against record 1, while columns (b) and (c) represent the locks required by threads of access of Unit of Work 1' against records 2 and 3 respectively. The bitmaps of column (d) represent the locks required by the thread of access of Unit of Work 2' against record 1. Columns (e) and (f) include the bitmaps representing the locks required by the thread of access of Unit of Work 2' against records 2 and 3 respectively.

Similar to FIG. 2, in the first row of the locking table of FIG. 3, Cursor A' requires a lock on record 1 as the fetch on Cursor A' returns record 1. Accordingly, Unit of Work 1' requests and obtains a lock on record 1. As this is the first lock required by Cursor A', Cursor A' is at this point assigned a site in the bitmap for Unit of Work 1'. This site is the rightmost bit, and the fact that Cursor A' requires a lock on record 1 is indicated by the bitmap at row 1 and column (a) having a 1 and not a 0 at its rightmost bit. In the second row of the locking table of FIG. 3, Cursor A' requires a lock on record 2 as the fetch on Cursor A' is to return record 2. Unit of Work 1' requests and obtains a lock on record 2, and this fact is represented in the bitmap of the second row of column (b) of the locking table by such bitmap having a 1 at its rightmost bit. In rows 3 and 4 of the locking table of FIG. 3, the fact that Cursor B' requires locks against records 2 and 3 is reflected in the bitmaps by the relevant bitmaps having a 1, rather than a 0, at the bit that is second to the right of the bitmap. So far, the first three columns of the locking table of FIG. 3 completely correspond to the locking table of FIG. 2.

At this point, however, Cursor X of Unit of Work 2' is to fetch record 1. Accordingly, Unit of Work 2' requests a lock on record 1, which lock is denied due to the pre-existing lock placed on record 1 by Unit of Work 1'. Accordingly, Cursor X has to wait for a lock on record 1 to be granted. In row 6, Cursor A' of Unit of Work 1' finishes and the its bit for Cursor A' is closed by replacing the 1 on the rightmost bit of the bitmap in row 6 of columns (a) and (b) with a 0. As the bitmap of column (a) at row 6 is now empty, Unit of Work 1' releases the lock against record 1, thereby permitting Unit of Work 2' to obtain a lock against record 1. Accordingly, Unit of Work 2' obtains the lock required by Cursor X, and this information is reflected in the bitmap column (d) at row 7. As this is the first lock required by Cursor X, Cursor X is assigned a site in the bitmap. This site is the rightmost point (note that the assignment of a site in a bitmap is done on a per unit of work basis—two units of work are free to assign the same site—although in different bitmaps—to necessarily different threads). Accordingly, the bitmap of row 7 of column (d) has a 1 at its rightmost bit, indicating that Cursor X of Unit of Work 2' requires a lock against record 1. In row 8, Unit of Work 2' obtains a lock against record 2, as the fetch on Cursor X is to return record 2. This lock is denied, as record 2 has already been locked by Unit of Work 1', as Cursor B' of Unit of Work 1' requires a lock against record 2 and has not terminated. Accordingly, as indicated in row 8, Cursor X has to wait for a lock on record 2. In row 9, Cursor B' finishes, and the bit for Cursor B' is closed by replacing the 1 in the bitmap site for Cursor B' in the bitmaps of row 9 at columns (b) and (c) with (a).

As the bitmaps of row 9 at columns (b) and (c) are now empty, Unit of Work 1' releases its locks against records 2 and 3, and Unit of Work 2' obtains locks on record 2 and 3. The fact that Cursor X obtained a lock against each of records 2 and 3 is indicated in the bitmaps of row 11 of columns (e) and (f) respectively having a 1 at the rightmost bit.

In row 12, Unit of Work 1' commits. Accordingly, the concurrency gained by the present invention arises from Unit of Work 2' being able to fetch record 1 at a point of time represented by row 7 of the locking table, and to fetch records 2 and 3 of the data table at a point in time represented by rows 10 and 11 of the locking table, instead of waiting for Unit of Work 2' to commit at a time 12 represented by row 12 of the locking table.

According to a further aspect of the invention, the dimension of the bitmap may be expanded as required in order for the unit of work to be able to represent each thread of access requiring a lock by a distinct site in the bitmap. Thus, if a unit of work owns n threads of access, then a bitmap having a dimension of at least n bits needs to be generated to record the required locks of the n threads of access. According to this aspect of the invention, the bitmap is essentially a list of the threads of access requiring locks. An advantage of this aspect of the present invention is that there is no limit on how many threads of access may be represented as requiring locks, which enhances concurrency. However, the cost of storing such a list for each record is likely to significantly add to the performance overhead. Accordingly, in a preferred embodiment of the present invention, the bitmap dimension is fixed in size and the bitmap always includes a reserved bit.

Referring to FIG. 4, the sequence in which locks are obtained and released in accordance with the preferred embodiment of the present invention is shown in a locking table. In the example of the locking table of FIG. 4, a Unit of Work 1", denoted as Application 1 in FIG. 4, uses Cursor A", B", C", D" and E" to open records 1, 2 and 3. In addition, a Unit of Work 2" denoted as Application 2 in FIG. 4, uses Cursor X" to open records 1, 2 and 3. As the bitmap of FIG. 4 has only four bits, and Unit of Work 1" has five threads of access, the bitmap dimension is not sufficient to uniquely accommodate all of the locking information required to separately reflect the locking requirements of each of the threads of access of Unit of Work 1". Accordingly, the bitmap includes a site for a reserved bit; this site is the leftmost bit of the bitmap in this example.

As with the locking table of FIG. 3, in the locking table of FIG. 4 each column represents different records that are opened by Unit of Work 1" and Unit of Work 2". The bitmaps listed under the column headed (a) represent the locks required by threads of access of Unit of Work 1" against record 1, while Columns (b) and (c) represents the locks required by threads of access of Unit of Work 1" against records 2 and 3 respectively. The bitmaps of Column (d) represent the locks required by the thread of access of Unit of Work 2" against record 1. Columns (e) and (f) contain the bitmaps representing the locks required by the thread of access of Unit of Work 2" against records 2 and 3 respectively.

Similar to FIG. 3, at a Time 1, represented by the first row of the locking table of FIG. 4, Cursor A" requires a lock on record 1 as the fetch on Cursor A" is to return record 1. Accordingly, Unit of Work 1" requests and obtains a lock on record 1. As this is the first lock required by Cursor A", Cursor A" is assigned a site in the bitmap for Unit of Work 1". This site is the rightmost bit, and the fact that Cursor A" requires a lock on record 1 is indicated by the bitmap of row 1 and Column (a) of the locking table of FIG. 4 having a 1 and not a 0 at its rightmost bit. In the second row of the locking table of FIG. 3, Cursor A" requires a lock on record 2 as the fetch on Cursor A" is to return record 2. Unit of Work 1 requests and obtains a lock on record 2, and this fact is represented in the bitmap of the second row of Column(b) of the locking table by such bitmap having a 1 at its rightmost bit. In rows 3 and 4 of the locking table of FIG. 4, the fact that cursor B" requests and obtains locks against records 2 and 3 is reflected in the bitmaps by the relevant bitmaps having a 1, rather than a 0, at the bit that is second to the right of the bitmap. Thus far, the locking table of FIG. 4 completely corresponds to the locking table of FIG. 3.

In row 5, Cursor C" requires a lock on record 1 as the fetch on Cursor C" is to return record 1. As this is the first lock required by Cursor C", Cursor C" is, at this point, assigned a site in the bitmap for Unit of Work 1". This site is the bit that is second from the left. Unit of Work 1" requests and obtains a lock on record 1, and this fact is represented in the bitmap of the fifth row of Column (a) having a 1, rather than a 0, at the bit that is second to the left of the bitmap.

In row 6, cursor D" requires a lock on record 2 as the fetch on Cursor D" is to return record 2. Record 2 has already been locked by Unit of Work 1" at a time 2 represented by row 2 of the locking table. As this is the first lock required by Cursor D", Cursor D" is assigned a site in the bitmap for Unit of Work 1" at this point. However, the bitmap for Unit of Work 1" has only one bit remaining, namely the leftmost bit, which is the reserved bit. Accordingly, Cursor D" is assigned the reserved bit for the bitmap of Unit of Work 1". The bitmap in the sixth row of Column (b) reflects the fact that Cursor D" requires a lock on record 2 by having a 1 rather than a 0 at its leftmost bit. As the reserved bit has been set to 1 for record 2, the lock on record 2 may not be released until Unit of Work 1" terminates.

In row 7, Cursor E" requires a lock on record 3 as the fetch on Cursor E is to return record 3. Record 3 was previously locked by Unit of Work 1" at a time 4 represented by row 4 of the locking table. As this is the first lock required by Cursor E", Cursor E" is assigned a site in the bitmap for Unit of Work 1". As no bits in the bitmap for Unit of Work 1" remain unassigned, Cursor E" is assigned the reserved bit, namely the leftmost bit of the bitmap. Accordingly, Cursor D and E are assigned the same bit in the bitmap for Unit of Work 1". The fact that Cursor E" has obtained a lock on record 3 is indicated by the bitmap of row 7 of Column (C) having a 1, rather than a 0, at its leftmost bit. As this bitmap includes the reserved bit, the lock on record 3 cannot be released until Unit of Work 1" terminates.

In row 8, Cursor X" of Unit of Work 2" is to fetch record 1. Accordingly, Unit of Work 2" requests a lock on record 1, which lock is denied based on the preexisting lock placed on record 1 by Unit of Work 1". Accordingly, Cursor X" has to wait for a lock on record 1 to be granted, and no changes are made to the locking table in row 8.

In row 9, Cursor A" of Unit of Work 1" finishes and the bit for Cursor A" is reset by replacing the 1 in the rightmost bit of the bitmaps in Columns (a) and (b) with a 0. However, the lock against record 1 is not released, as a 1 remains in the bit that is second from the right, indicating that Cursor C" still requires a lock against record 1. The lock against record 2 is not released as the reserved bit has been returned for record 2, indicating that the lock against record 2 cannot be released until Unit of Work 1" terminates.

In row 10, Cursor B" of Unit of Work 1" finishes and the bit for Cursor B" is reset by replacing the 1 in the bitmap site for Cursor B" in the bitmaps of Columns (b) and (c), with a 0. Again, no lock is released as the reserved bit has been returned for both records 3 and 2, indicating that these records may only be released when Unit of Work 1" terminates.

In row 11, Cursor C" of Unit of Work 1" finishes and the bit for Cursor C" is reset by replacing the 1 in the bitmap site for Cursor C" in the bitmap of Column (a) with a 0. Accordingly, the bitmap for record 1 is now empty and Unit of Work 1" releases the lock against record 1.

In row 12, Cursor X" of Unit of Work 2" is to fetch record 1. Accordingly, Unit of Work 2" obtains a lock on record 1. As this is the first lock required by Cursor X", Cursor X" is assigned a site in the bitmap for Unit of Work 2". This site is the rightmost bit and the fact that Cursor X" requires a lock on record 1 is indicated by the bitmap at Column (d) and row 12 having a 1 and not a 0 at its rightmost bit.

In row 13, Cursor X" of Unit of Work 2" is to fetch record 2. However, record 2 is still locked by Unit of Work 1", and, accordingly Unit of Work 2" is unable to obtain a lock on record 2, and Cursor X" must wait for a lock to be granted on record 2.

In row 14, Cursor D" of Unit of Work 1" finishes. However, as the reserved bit has been assigned to Cursor D", and the reserved bit cannot be removed from the bitmap until Unit of Work 1" terminates, there is no change in the bitmap of row 14 of Column (B) and Unit of Work 1" does not release the lock held against record 2. Similarly, at row 15, Cursor E" of Unit of Work 1" finishes. However, as Cursor E" was assigned the reserved bit, there is no change in the bitmap of Column (c) at row 15, as the reserved bit may not be removed until Unit of Work 1" terminates. Accordingly, Unit of Work 1" retains the lock on record 3.

In row 16, Unit of Work 1" commits, and the locks on records 2 and 3 are released as the reserved bit can be removed from the bitmaps for these records at this time. As Unit of Work 1" has released the lock against record 2, Unit of Work 2" obtains a lock against record 2, and the fetch on Cursor X" returns record 2. The fact that Cursor X" obtained a lock against 2 is reflected in the bitmap of Column (e) at row 17 having a 1 at its rightmost bit. In row 18, Unit of Work 2" obtains a lock against record 3 and the fetch on cursor X" returns record 3. The fact that cursor X" obtained a lock on record 3 is reflected in the bitmap of Column (f) at row 18 having a 1 at its rightmost bit.

While the concurrency gains are not as significant in this case as they are relative to the examples in FIGS. 2 and 3, there remain concurrency gains. Specifically, as the reserved bit was not returned relative to record 1, the lock placed by Unit of Work 1" relative to this record could be released before Unit of Work 1" committed, so that Unit of Work 2" could obtain access to record 1 at the time represented by row 12, instead of having to wait until after the time represented by row 16 when Unit of Work 1" committed.

The present invention may be embodied in other specific forms without departing from the spirit or essential characteristics thereof. Certain adaptations and modifications of the invention will be obvious to those skilled in the art. For example, the type of lock used will depend on the isolation level to be preserved.

Further, while the foregoing description relates to records, it will be appreciated by those skilled in the art that the invention is also applicable to other objects, such as tables. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A lock control data structure for a unit of work of an application program, the lock control data structure comprising:
   (a) a set of object-specific lock models corresponding to a set of objects accessible to the application program, each object-specific lock model having an associated set of lock elements, wherein a thread-specific access requirement for each thread in a set of threads of access for opening the set of objects is representable by an associated lock element and wherein each object-specific lock model is configured to have a common lock model configuration, the common lock model configuration having a definition set of lock elements, each thread being representable by an associated definition lock element, and the common lock model configuration comprising a thread mapping means for determining the associated definition lock element for each thread, each associated set of lock elements of each object-specific lock model being configured according to the definition set of lock elements, and the thread mapping means being operable to add new definition lock elements to the definition set of lock elements when a number of threads in the set of threads exceeds a number of lock elements in the definition set of lock elements and each object having an associated object-specific lock model, wherein the associated set of lock elements dynamically stores the thread-specific access requirement of each thread relative to the object; and
   (b) a lock controller for locking each object when the associated set of lock elements is not empty, and for unlocking each object when the associated set of lock elements is empty, the associated set of lock elements being empty when no locking requirements are stored therein.

2. A lock control data structure for a unit of work of an application program, the lock control data structure comprising:
   (a) a set of object-specific lock models corresponding to a set of objects accessible to the application program, each object-specific lock model having an associated set of lock elements, wherein a thread-specific access requirement for each thread in a set of threads of access for opening the set of objects is representable by an associated lock element and wherein each object-specific lock model is configured to have a common lock model configuration, the common lock model configuration having a definition set of lock elements, each thread being representable by an associated definition lock element, and the common lock model configuration comprising a thread mapping means for determining the associated definition lock element for each thread, each associated set of lock elements of each object-specific lock model being configured according to the definition set of lock elements, wherein the set of definition lock elements includes a reserved lock element and a subset of releasable lock elements, the subset of releasable lock elements having a predefined number of releasable lock elements, wherein.
   (i) if a number of threads in the set of threads exceeds the predefined number of releasable lock elements, then the set of threads includes at least one commit thread and a releasable subset of threads, the thread mapping means being operable
      to determine for each releasable thread a unique associated releasable lock element in the subset of releasable lock elements, and
      to determine the reserved element for the at least one commit thread; otherwise
      the thread mapping means being operable to determine for each thread a unique associated releasable lock element in the subset of releasable lock elements;
   (ii) for each object when the thread-specific access requirements cease for each releasable thread, the unique associated releasable lock element is updatable to remove the thread-specific locking requirements stored therein; and
   (iii) the reserved lock is not updateable to remove thread-specific locking requirements stored therein and
      each object having an associated object-specific lock model, wherein the associated set of lock elements dynamically stores the thread-specific access requirement of each thread relative to the object; and
   (b) a lock controller for locking each object when the associated set of lock elements is not empty, and for unlocking each object when the associated set of lock elements is empty, the associated set of lock elements being empty when no locking requirements are stored therein.

3. A computer software product for an application program having a unit of work, the computer software product comprising:
   a recording medium;
   means recorded on the medium for configuring a computer to have a lock control data structure having
      (a) a set of object-specific lock models corresponding to a set of objects accessible to the application program,
      each object-specific lock model having an associated set of lock elements, wherein a thread-specific access requirement for each thread in a set of threads of access for opening the set of objects is representable by an associated lock element and wherein each object-specific lock model is configured to have a common lock model configuration, the common lock model configuration having a definition set of lock elements, each thread being representable by an associated definition lock element, and the common lock model configuration comprising a thread mapping means for determining the associated definition lock element for each thread, each associated set of lock elements of each object-specific lock model being configured according to the definition set of lock elements, and the thread mapping means being operable to add new definition lock elements to the definition set of lock elements when a number of threads in the set of threads exceeds a number of lock elements in the definition set of lock elements and each object having an associated object-specific lock model, wherein the associated set of lock elements dynamically stores the thread-specific access requirement of each thread relative to the object; and (b) a lock controller for locking each object when the associated set of lock elements is not empty, and for unlocking each object when the associated set of lock is empty, the associated set of lock elements being empty when no locking requirements are stored therein.

4. A computer software product for an application program having a unit of work, the computer software product comprising:

a recording medium;

means recorded on the medium for configuring a computer to have a lock control data structure having (a) a set of object-specific lock models corresponding to a set of objects accessible to the application program, each object-specific lock model having an associated set of lock elements, wherein a thread-specific access requirement for each thread in a set of threads of access for opening the set of objects is representable by an associated lock element and wherein each object-specific lock model is configured to have a common lock model configuration, the common lock model configuration having a definition set of lock elements, each thread being representable by an associated definition lock element, and the common lock model configuration comprising a thread mapping means for determining the associated definition lock element for each thread, each associated set of lock elements of each object-specific lock model being configured according to the definition set of lock elements, wherein the set of definition lock elements includes a reserved lock element and a subset of releasable lock elements, the subset of releasable lock elements having a predefined number of releasable lock elements, wherein (i) if a number of threads in the set of threads exceeds the predefined number of releasable lock elements, then the set of threads includes at least one commit thread and a releasable subset of threads, the thread mapping means being operable to determine for each releasable thread a unique associated releasable lock element in the subset of releasable lock elements, and to determine the reserved element for the at least one commit thread; otherwise the thread mapping means being operable to determine for each thread a unique associated releasable lock element in the subset of releasable lock elements;

(ii) for each object when the thread-specific access requirements cease for each releasable thread, the unique associated releasable lock element is updatable to remove the thread-specific locking requirements stored therein; and (iii) the reserved lock is not updateable to remove thread-specific locking requirements stored therein and each object having an associated object-specific lock model, wherein the associated set of lock elements dynamically stores the thread-specific access requirement of each thread relative to the object; and (b) a lock controller for locking each object when the associated set of lock elements is not empty, and for unlocking each object when the associated set of lock is empty, the associated set of lock elements being empty when no locking requirements are stored therein.

5. A data processing system for opening a set of objects accessible to the data processing system in a unit of work, the data processing system comprising a lock control data structure having (a) a set of object-specific lock models corresponding to a set of objects accessible to the application program, each object-specific lock model having an associated set of lock elements, wherein a thread-specific access requirement for each thread in a set of threads of access for opening the set of objects is representable by an associated lock element and wherein each object-specific lock model is configured to have a common lock model configuration, the common lock model configuration having a definition set of lock elements, each thread being representable by an associated definition lock element, and the common lock model configuration comprising a thread mapping means for determining the associated definition lock element for each thread, each associated set of lock elements of each object-specific lock model being configured according to the definition set of lock elements, and the thread mapping means being operable to add new definition lock elements to the definition set of lock elements when a number of threads in the set of threads exceeds a number of lock elements in the definition set of lock elements and each object having an associated object-specific lock model, wherein the associated set of lock elements dynamically stores the thread-specific access requirement of each thread relative to the object; and (b) a lock controller for locking each object when the associated set of lock elements is not empty, and for unlocking each object when the associated set of lock elements is empty, the associated set of lock elements being empty when no locking requirements are stored therein.

6. A data processing system for opening a set of objects accessible to the data processing system in a unit of work, the data processing system comprising a lock control data structure having (a) a set of object-specific lock models corresponding to a set of objects accessible to the application program, each object-specific lock model having an associated set of lock elements, wherein a thread-specific access requirement for each thread in a set of threads of access for opening the set of objects is representable by an associated lock element and wherein each object-specific lock model is configured to have a common lock model configuration, the common lock model configuration having a definition set of lock elements, each thread being representable by an associated definition lock element, and the common lock model configuration comprising a thread mapping means for determining the associated definition lock element for each thread, each associated set of lock elements of each object-specific lock model being configured according to the definition set of lock elements, wherein the set of definition lock elements includes a reserved lock element and a subset of releasable lock elements, the subset of releasable lock elements having a predefined number of releasable lock elements, wherein (i) if a number of threads in the set of threads exceeds the predefined number of releasable lock elements, then the set of threads includes at least one commit thread and a releasable subset of threads, the thread mapping means being operable to determine for each releasable thread a unique associated releasable lock element in the subset of releasable lock elements, and to determine the reserved element for the at least one commit thread; otherwise the thread mapping means being operable to determine for each thread a unique associated releasable lock element in the subset of releasable lock elements;

(ii) for each object when the thread-specific access requirements cease for each releasable thread, the unique associated releasable lock element is updatable to remove the thread-specific locking requirements stored therein; and (iii) the reserved lock is not updateable to remove thread-specific locking requirements stored therein and each object having an associated object-specific lock model, wherein the associated set of lock elements dynamically stores the thread-specific access requirement of each thread relative to the object; and (b) a lock controller for locking each object when the associated set of lock elements is not empty, and for unlocking each object when the associated set of lock is empty, the associated set of lock elements being empty when no locking requirements are stored therein.

* * * * *